United States Patent
Japp

(10) Patent No.: US 9,699,490 B1
(45) Date of Patent: Jul. 4, 2017

(54) ADAPTIVE FILTERING TO ADJUST AUTOMATED SELECTION OF CONTENT USING WEIGHTINGS BASED ON CONTEXTUAL PARAMETERS OF A BROWSING SESSION

(71) Applicant: Amazon Technologies, Inc., Seattle, WA (US)

(72) Inventor: Robert Philip Japp, Glasgow (GB)

(73) Assignee: Amazon Technologies, Inc., Seattle, WA (US)

(*) Notice: Subject to any disclaimer, the term of this patent is extended or adjusted under 35 U.S.C. 154(b) by 0 days.

(21) Appl. No.: 14/660,775

(22) Filed: Mar. 17, 2015

Related U.S. Application Data

(60) Provisional application No. 62/114,813, filed on Feb. 11, 2015.

(51) Int. Cl.
*H04H 60/32* (2008.01)
*H04N 21/25* (2011.01)
*H04N 21/466* (2011.01)

(52) U.S. Cl.
CPC ....... *H04N 21/251* (2013.01); *H04N 21/4668* (2013.01)

(58) Field of Classification Search
CPC ........... H04N 21/251; H04N 21/44222; H04N 21/4668; H04H 60/43–60/54
See application file for complete search history.

(56) References Cited

U.S. PATENT DOCUMENTS

| | | | |
|---|---|---|---|
| 5,635,989 A * | 6/1997 | Rothmuller | H04N 5/445 348/553 |
| 8,533,767 B1 * | 9/2013 | Tsang | H04N 21/251 725/105 |
| 2002/0178257 A1 * | 11/2002 | Cerrato | G06F 21/316 709/224 |

* cited by examiner

*Primary Examiner* — Yassin Alata
(74) *Attorney, Agent, or Firm* — Knobbe, Martens, Olson & Bear, LLP

(57) ABSTRACT

This disclosure provides examples of computer-implemented systems and processes for determining a user browsing session context, intent, or activity based on contextual information associated with a user's browsing session, and using this determined context as a basis to filter or improve selection of content items for the user. For example, if the user is building up a watch list (for example, discovering new titles), then it may be desirable to filter out items for recommendation which are already on that watch list. However, when the user is searching for something to watch in the current session (for example, consuming content), then it may be more appropriate to show items already added to the watch list as recommended content. Item recommendations can thus be improved or filtered based in part on parameters of the user's browsing activity with respect to content items.

21 Claims, 5 Drawing Sheets

US 9,699,490 B1

ADAPTIVE FILTERING TO ADJUST AUTOMATED SELECTION OF CONTENT USING WEIGHTINGS BASED ON CONTEXTUAL PARAMETERS OF A BROWSING SESSION

CROSS-REFERENCE TO RELATED APPLICATION

This application is a nonprovisional of U.S. Provisional Application No. 62/114,813, filed Feb. 11, 2015, titled "WEIGHTING OF RECOMMENDED CONTENT BASED ON USER BROWSING CONTEXT," which is hereby incorporated by reference in its entirety.

BACKGROUND

Web sites and other types of interactive electronic catalog systems commonly include recommendation systems for providing recommendations of items such as items that are available for download and/or purchase. The recommendations are typically generated based on monitored user activities or behaviors, such as item purchases, item viewing events, item play events, item rentals, and/or other types of item consumption actions. In some systems, the recommendations are additionally or alternatively based on users' explicit ratings of items.

BRIEF DESCRIPTION OF THE DRAWINGS

Throughout the drawings, reference numbers may be re-used to indicate correspondence between referenced elements. The drawings are provided to illustrate example embodiments described herein and are not intended to limit the scope of the disclosure.

DETAILED DESCRIPTION

Overview

Figure 1:
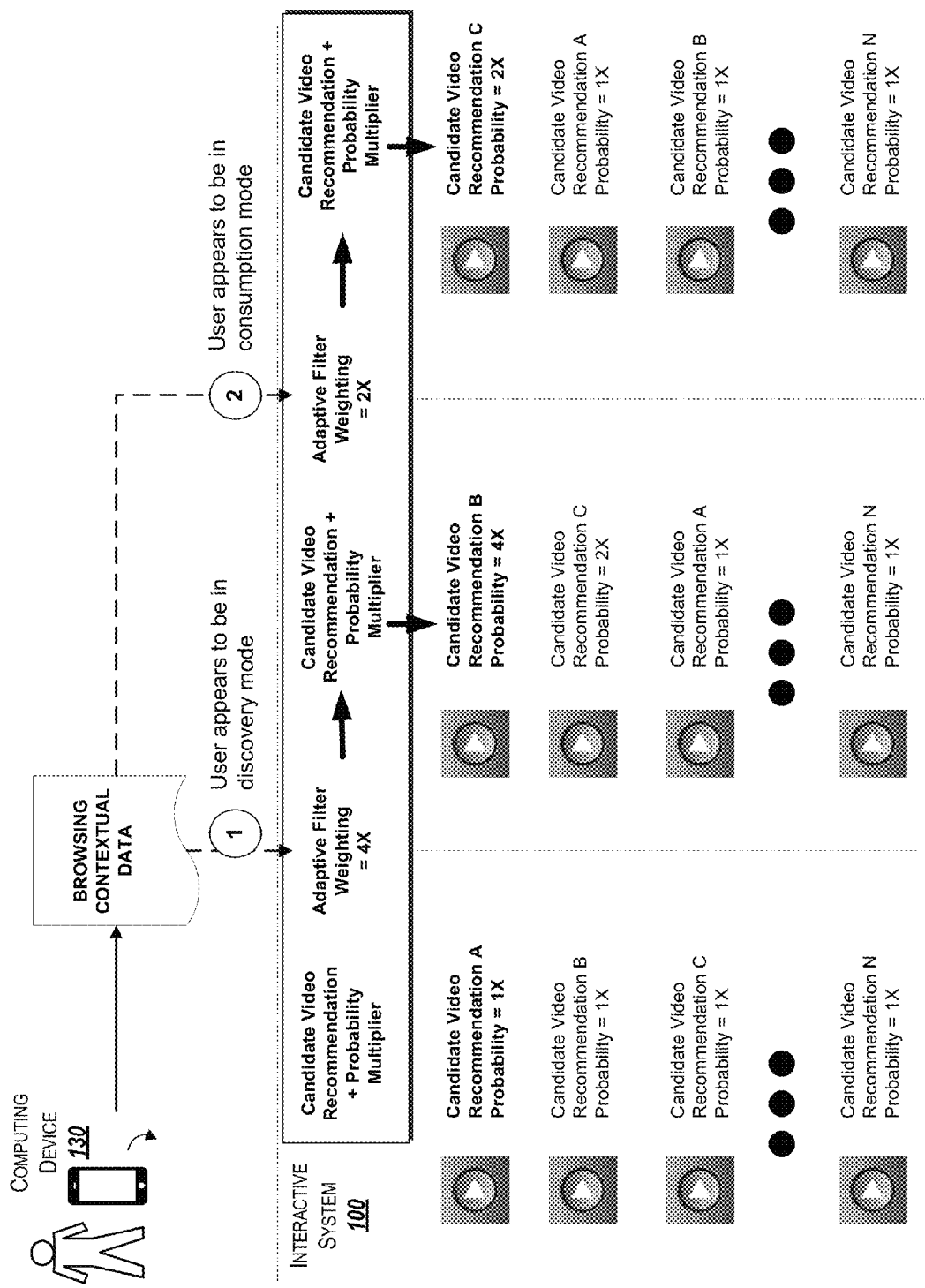
FIG. 1 is a data flow diagram illustrating how a user's browsing session contextual data may be used to improve a recommendation of a video content item, as implemented by an interactive system, such as the interactive system of FIG. 5.

Several different computer-implemented processes will now be described for determining user browse or browsing session intent and/or activity to improve the utility of item recommendations provided to users. These processes may be embodied individually or in any combination in a multi-user computer system ("system"). A recommendation engine capable of ranking, re-ranking, and selecting items to recommend to a user based on a set of source items may also be used.

Network-based digital content services have become an increasingly popular way for consumers to access and consume content in a digital format. Digital content services are often set up to stream content from an electronic catalog, and are typically accessible from mobile and desktop computing devices, as well as home entertainment systems, televisions, USB-based media streaming devices, and practically any other computing device configured to access a media library either on a local network or over the Internet.

Digital content services, including those provided by the interactive system described herein, provide a variety of ways by which users can preview, watch or listen to, purchase, rent, and otherwise consume digital content (such as video content, music, audiobooks, and other forms of audio-based content) in a variety of ways (such as by streaming, downloading, etc.). Users can explore a digital content catalog which is frequently organized by various categories or attributes (for example, for music: genre, artist, album, tags, etc.; or, for video content: genre, style, director, actor, studio, etc.). One increasingly popular way by which users enjoy the digital content catalog is by watch lists or playlists, which can be user-specified or pre-generated by the digital content service. For example, a user may be able to create a watch list comprising items of video content by browsing and adding titles to the watch list; by indicating a particular genre, actor or studio (or other attribute) of interest; or in other ways. The digital content service may also identify particular items for the user's watch list which the user may find of interest, based on the particular genre, actor, studio, or other criteria specified by the user. Or, in another example, the digital content service may offer one or more pre-configured streaming video stations based on popular genres, actors, video content (for example, popular movies or television shows), and the like.

The present disclosure describes a system and associated processes for determining a user browse or browsing session context, intent, or activity based on contextual information associated with browsing session, and using this determined context as a basis to select an item for recommendation or to filter or improve item recommendations for the user. For example, if the user is building up a watch list (for example, discovering new titles), then it may be desirable to filter out items for recommendations which are already on that watch list. However, when that same user is searching for something to watch in the current session (for example, consuming content), then it may be more appropriate to show items already added to the watch list as recommended content. Determining the user's browsing session context, intent, or activity can be difficult. The systems and methods described herein describe example techniques for using contextual information (such as user and/or device activity) associated with the browsing session to determine a user browsing context (for example, discovery mode or consumption mode) for the current session. For example, in some instances the user may use a certain device, such as a tablet computing device or smart phone, to discover new content and another device, such as a television, to consume content. Or, the user may, based on current and past behavioral data and trends, tend to discover new content at certain times or days of the week and consume content at other times or days.

Contextual information may be determined, detected, or accessed by or from a computing device used by the user during browsing sessions and interactions with the interactive system (for example, while accessing the digital content service). The contextual information may include, describe, or otherwise indicate data and information related to the computing device and/or the user's activity with respect to the computing device. Contextual information may include various attributes or parameters, for example: whether the user is using an application or browser; data descriptive of the type of device being used; Internet Protocol ("IP") address or other device identifying attributes; a timestamp (e.g., a date and time) of the browsing session; sensor (e.g., accelerometer and/or motion detector data) associated with the computing device, e.g., indicating whether the device is stationary or in motion, and if so to what extent (for example, jostling as in the user's hand, moving smoothly as in a car, and so on); state information associated with the computing device (for example, whether a display screen is on or off, whether the device is connected to a network, whether the device is linked to another device such as a car, and so on); a physical location associated with the browsing session (for example, as detected by location services, GPS coordinates, and so on); information about other applications which may be running on the computing device; and so on. In some instances, the contextual information may include historical browse information indicative of a discovery time range during which the user typically is exploring content items, or of a consumption time range during which the user typically is consuming content items. For example, the user's browse session data over time may indicate that the user typically "discovers" new content at a particular time of day (e.g., in the morning) and that the user typically "consumes" new content at another particular time of day (e.g., at night).

In certain embodiments, once the user's browsing session context, intent, or activity has been determined, item recommendations for the user may be selected, filtered, or weighted based on the determination. For example, in some circumstances in which there may be multiple desirable actions that can be driven by merchandising content and item recommendations, more flexible filtering of recommended content may be desirable. In particular, for digital content such as streaming video, merchandising content can drive multiple desirable actions including: the customer adding a title to his or her watch list, watching a trailer, or watching the entire video. In such cases, more flexible filtering rules can be beneficial: for example, a determination that the user is in a "discovery mode" can be used to filter out item recommendations which already appear on the user's watch list; and, a determination that the user is in "consumption mode" can be used to include or show item recommendations for items already added to the watch list.

In determining whether and to what extent item recommendations should be filtered from a candidate list of recommendations, additional information about candidate items and when they were added to the user's watch list may be used. For example, in one scenario, items which were added to watch list a certain number of days prior to the current browsing session (for example, five days) may be removed from the candidate list of item recommendations in conjunction with a determination that the user is in "discovery mode." This is beneficial to the user who may not wish to see item recommendations for those items he recently added to the watch list. On the other hand, if the user is in "consumption mode" then the user may wish to see item recommendations for those items as these may be items the user wishes to watch now. In other scenarios, variable periods of time may be used as a basis for this adaptive filtering. For example, the variable period of time may be determined based on the typical or average elapsed time between any user adding any title to their watch list and actually watching it. Or, as another example, the variable period of time may be determined based on the typical or average elapsed time between the particular user adding any title to their watch list and actually watching it. Or, as another example, the variable period of time may be determined based on the elapsed time between any user adding that title to their watch list and actually watching it.

As used herein, the term "item," in addition to having its ordinary meaning, is used interchangeably to refer to an item itself (e.g., a particular product, application, or the like) and to its description or representation in a computer system. As will be apparent from the context in which it is used, the term is also sometimes used herein to refer only to the item itself or only to its representation in the computer system. As used herein, the term "application," in addition to having its ordinary meaning, can mean, among other things, executable code or instructions, interpreted code or instructions (such as Java™ bytecode or the like), scripted code, source code, object code, assembly code, any of the above together with associated data, and the like.

Embodiments of the disclosure will now be described with reference to the accompanying figures. The terminology used in the description presented herein is not intended to be interpreted in any limited or restrictive manner, simply because it is being utilized in conjunction with a detailed description of certain specific embodiments of the disclosure. Furthermore, embodiments of the disclosure may include several novel features, no single one of which is solely responsible for its desirable attributes or which is essential to practicing the embodiments of the disclosure herein described.

Example Process and Data Flow

Figure 5:
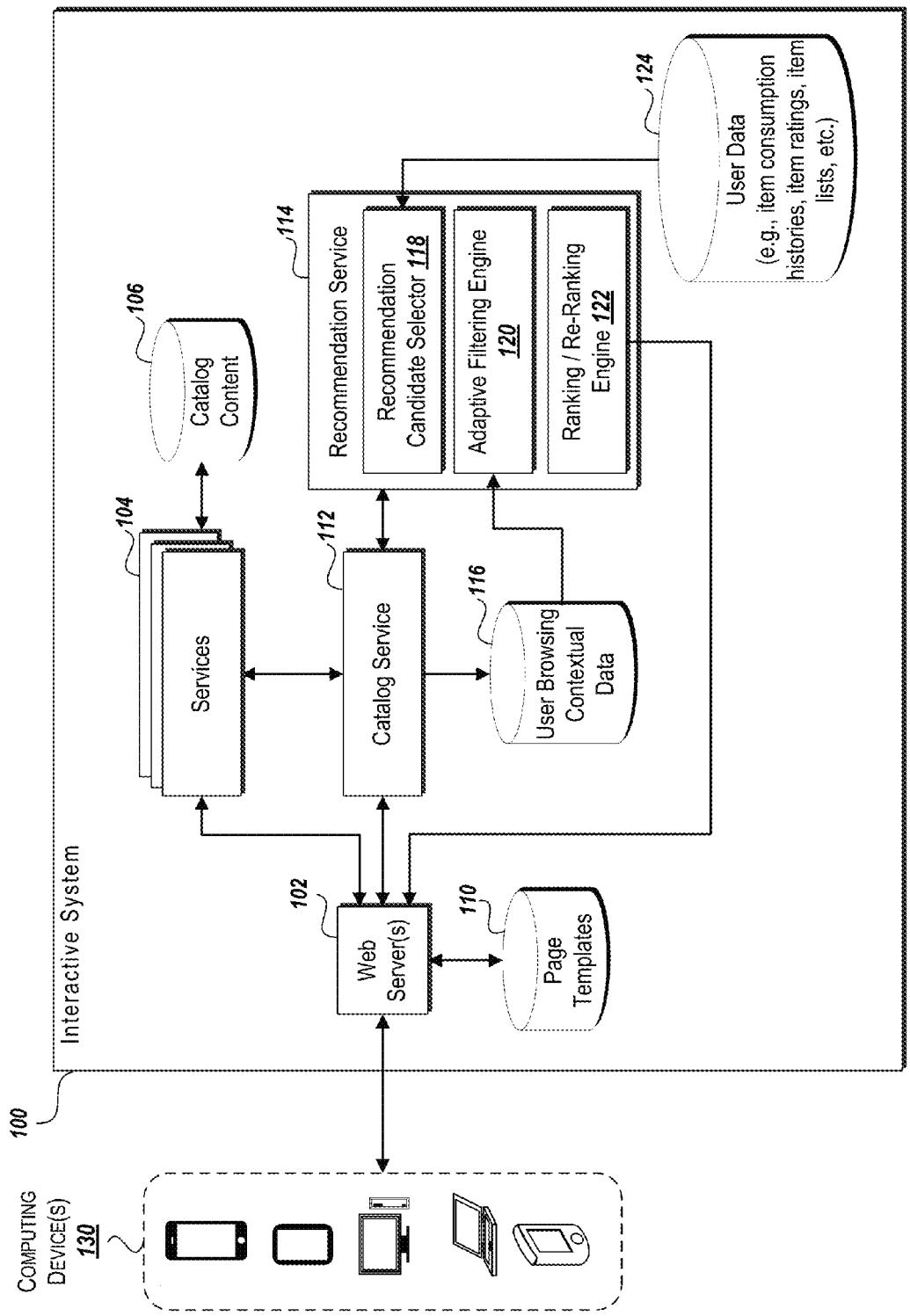
FIG. 5 schematically illustrates an embodiment of an interactive system that implements evaluation of user browsing contextual data and related processes, which may be used to, among other things, provide or improve item recommendations to users.

FIG. 1 is an example data flow diagram illustrating how a user's browsing session contextual data may be used to improve a recommendation of a video content item, as implemented by an interactive system, such as the interactive system 100 of FIG. 5. In particular, the data flow diagram of FIG. 1 illustrates two hypothetical scenarios of how different contextual information can contribute to determinations of different user browsing contexts, which in turn may lead to selection of different candidate videos to be presented to the user in an item recommendation. Of course, many other hypothetical scenarios involving different contextual information may be possible, which can contribute to a wide range of different user browsing contexts and lead to selection of different candidate videos.

As shown in FIG. 1, a user of computing device 130 is browsing or otherwise interacting with the interactive system 100. The interactive system 100 may have a list or queue of candidate video recommendations A, B, C . . . N which may be selected as a video to be provided to the computing device 130 as an item recommendation or with some form of merchandising content. The list of candidate video recommendations may be accessed from a repository (such as the user profile data 124). For example, the repository may store watch lists, playlists, television stations which may include one or more pre-selected video items, and so forth.

Each of the candidate video recommendations A, B, C . . . N may have an associated weighting factor or probability or likelihood of being selected for an item recommendation. For ease of illustration, each candidate video recommendation A, B, C . . . N shown in FIG. 1 initially has an associated probability of 1× to indicate that in the current state each candidate video recommendation is equally likely to be selected. However, in other scenarios the associated probabilities may vary based on a wide variety of criteria, including but not limited to attributes each candidate video recommendation may have in common with other videos which the user has previously viewed and/or rated (either favorably or unfavorably); attributes each candidate video recommendation may have in common with other preferences associated with the user (for example, whether the user prefers movies or TV shows of a certain genre, by a particular production studio, including a certain actor, and so on).

As the two illustrated scenarios in FIG. 1 demonstrate, the associated probability of being selected for an item recommendation may be modified based on browsing contextual data for the user. Such contextual information may be useful to fine-tune or otherwise improve the accuracy of the selected video recommendation being one which the user will respond to well. In scenario 1 of FIG. 1, the contextual information for the browsing session indicates that the user may be in a "discovery" or exploration mode—for example, searching for and exploring new content, adding content items to a watch list or other interest list (such as a wish list, or a list of items which may be of interest to the user, including items expressly added by the user or items automatically added or suggested by, for example, the interactive system 100), watching video trailers (but not entire video items like a full movie or TV episode), and so on. Examples of how this determination may be made are described in more detail illustrated and described herein with reference to the process 200 of FIG. 2. The interactive system 100 (for example, via the adaptive filtering engine 120) may analyze various data points and factors associated with the contextual information and determine an adaptive filter weighting to be applied to one or more candidate item recommendations.

In scenario 1 of FIG. 1, a weighting factor of 4× has been determined, indicating that certain items in the list of candidate videos which should be selected for recommendation, because the user appears to be in discovery mode, should receive a probability or ranking boost to increase the chance of being selected for recommendation. The example value of "4×" is merely for illustration to indicate that some items in the candidate list may receive a relative probability boost of four times, although any other type of value or weighting may be used depending on the implementation. The weighting factor may then be used to rank or re-rank the list of candidate video recommendations, for example by adjusting the associated probability of being selected as a recommendation based at least in part on the determined weighting factor. For example, a candidate item might have an initial probability of being selected of 10%; this would be the candidate item's 1× or baseline probability of being selected. A weighting factor of 4× may be applied for this hypothetical candidate item, such that adjusted or weighted probability of being selected may increase to 40%; this would be the candidate item's 4× or adjusted probability of being selected. As the adjusted probability of being selected increases for one candidate item, other candidate items may receive lower adjusted probabilities, including in some cases an adjusted probability of zero, in order to maintain the overall sum of probabilities at 100%. The ranking or re-ranking may be a simple multiplier or involve more complex calculations based on criteria or attributes associated with each candidate video item, including either shared or differing attributes each candidate video may have relative to other videos the user may have viewed or rated.

In one embodiment, the ranking, re-ranking, or removal of items from the candidate list may be based on how recently each candidate video was added to a watch list. For example, suppose that candidate video recommendation B is a new item the user has not yet viewed or added to a watch list; candidate video recommendation C was added to the user's watch list a month before the current browsing session; and candidate video recommendation A was added within five minutes of the current browsing session. As mentioned before for scenario 1, the browsing context and associated weighting factor may indicate that the user is in discovery mode, and thus candidate video recommendation B may receive a higher probability boost to increase the likelihood of it being provided as an item recommendation to the user; candidate video recommendation C may receive a slight probability boost due to the relatively longer time since the user added it to the watch list (for example, perhaps the user forgot he added it); and candidate video recommendation A may be removed from the candidate list since it was just added to the watch list (and thus, the user is not likely to want to see this video as a recommendation during the current discovery-oriented browsing session).

In scenario 2 of FIG. 1, the contextual information indicates the contextual information for the browsing session indicates that the user may be in a "consumption" or viewing/listening mode—for example, actively viewing or streaming content, watching video trailers and/or entire video items like a full movie or TV episode, and so on. Examples of how this determination may be made are described in more detail illustrated and described herein with reference to the process 200 of FIG. 2. The interactive system 100 (for example, via the adaptive filtering engine 120) may analyze various data points and factors associated with the contextual information and determine an adaptive filter weighting to be applied to one or more candidate item recommendations.

In scenario 2 of FIG. 1, a weighting factor of 2× has been determined, indicating that certain items in the list of candidate videos which should be selected for recommendation, because the user appears to be in consumption mode, should receive a probability or ranking boost to increase the chance of being selected for recommendation. The weighting factor can then be used to rank or re-rank the list of candidate videos. For example, suppose that candidate video recommendation B is a new item the user has not yet viewed or added to a watch list; candidate video recommendation C was added to the user's watch list a month before the current browsing session; and candidate video recommendation A was added within five minutes of the current browsing session. As mentioned before for scenario 2, the browsing context and associated weighting factor may indicate that the user is in consumption mode, and thus candidate video recommendation C may receive a higher probability boost to increase the likelihood of it being provided as an item recommendation to the user; candidate video recommendation A may receive a slight or neutral probability boost due to the relatively shorter time since the user added it to the watch list (for example, perhaps the user is more likely to want to watch it now since it was more recently added); and candidate video recommendation B may receive a slight or neutral probability boost since it has not yet been added to the user's watch list and it is less certain whether the user will respond favorably and decide to watch or add candidate video recommendation B to a watch list.

Figure 2:
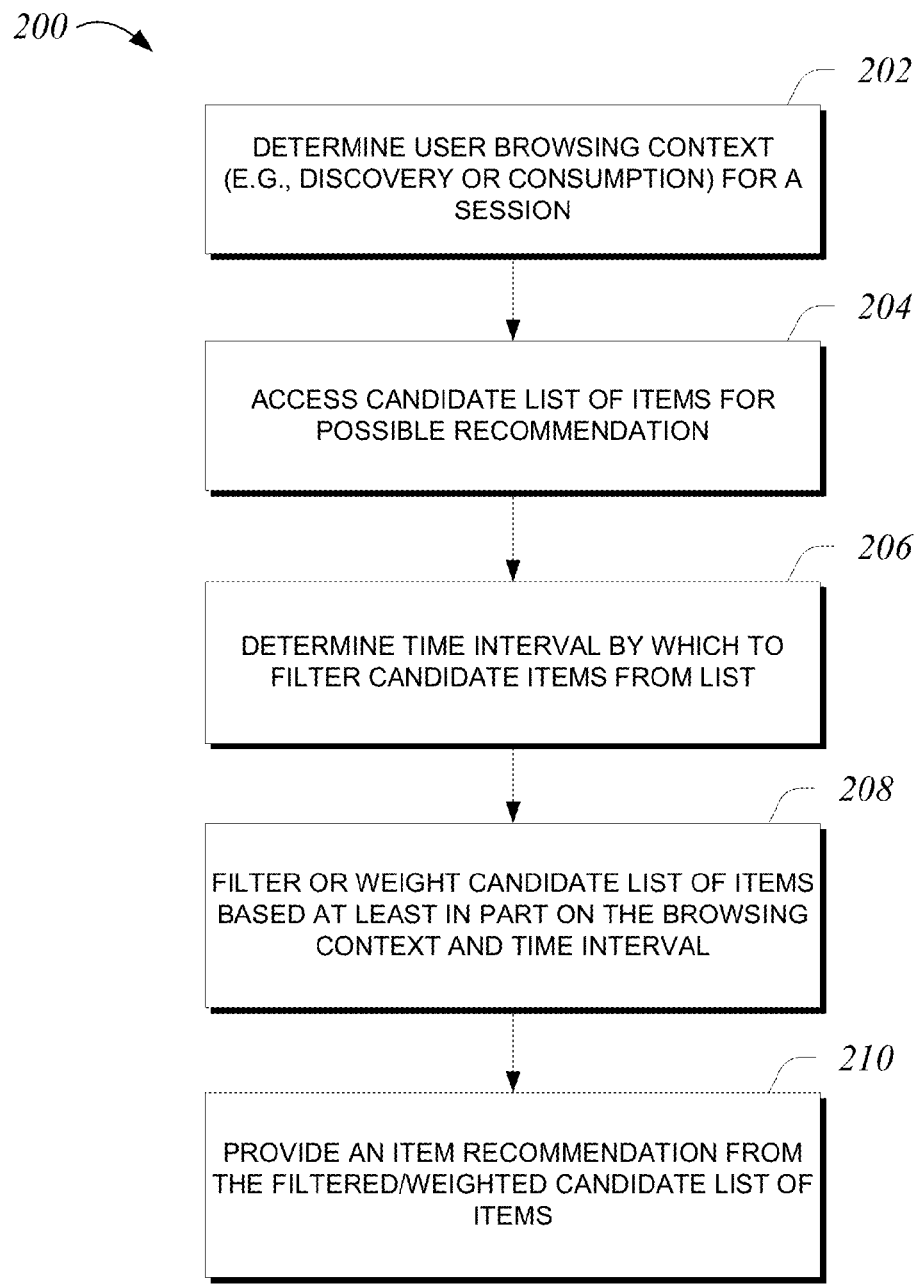
FIG. 2 is a flow diagram of an example method for determining a user's browsing context for a session, and generating an item recommendation based at least in part on the determined browsing context, as implemented by an interactive system, such as the interactive system of FIG. 5.

Example Method of Using Browsing Contextual Information to Determine Item Recommendation FIG. 2 is an example flow diagram of an example process 200 for determining a user's browsing context for a session, and generating an item recommendation based at least in part on the determined browsing context, as implemented by an interactive system, such as the interactive system 100 of FIG. 5.

At block 202, the process 200 determines a user browsing context (for example, discovery, or consumption) for a browsing session. The determination may be based on, for example, contextual information or data associated with the user's browsing behavior, device, and/or interactions with the interactive system 100. The contextual information may be received from the computing device 130, or accessed from the user browsing contextual data 116. The contextual information may be detected by the computing device 130 and/or by an application (which may be provided in association with the interactive system 100 in order to enable access to the digital content service) running on the computing device 130. The computing device 130 and/or application may be configured to collect user and/or device activity and state information at the approximate time or period of time when the user is browsing the catalog, and provide the collected user and/or device activity and state information in a bundle of contextual information to the interactive system 100.

The user browsing context may be determined based on the contextual information in a variety of ways and based on variety of factors. For example, contextual information describing a type of device (for example, laptop, tablet, smart phone, etc.) the user is using during the browsing session may be indicative of a particular consumer behavior, either for the particular user or across multiple users. For example, the user's previous browsing sessions and behavior may indicate that when the user is browsing from a laptop or a television (or from a relatively larger device), he or she is more likely to be consuming content (for example, watching a streaming video) than discovering new content to be consumed later (for example, browsing new releases and adding items to a watch list); or vice versa, that he or she is more likely to be discovering new content when browsing from a tablet or smart phone (or from a relatively smaller device). The type of device may be determined based on various factors such as device identifiers or attributes associated with the device. Device identifiers or attributes may indicate, for example, that the device is a smartphone, a tablet, a laptop, a television, or some other type of device. Device attributes may indicate, for example, the size or dimensions of the device, the screen resolution of the device, a type of operating system installed on the device, whether the device has wireless connectivity (including Wi-Fi or broadband), a GPS receiver, and so on. In some instances overall consumer behavior may be analyzed to determine which type of device is more likely to indicate particular browsing contexts, and this data may be compared or applied to the current user browsing session for the user as part of the determination of the current user browsing context. Other contextual information factors which may be analyzed for trends and compared to the current user browsing session may include the time of day (for example, a user may be more or less likely to consume content at particular times or days of the week); a location (for example, a user may be more or less likely to consume content at particular locations); whether a browser or other application is used to discover and/or consume data; an IP address; and so on.

In another example, the user's browsing context may be determined based in part on an intent or design goal associated with particular merchandising content the user may be viewing. For example, if a particular item or page of merchandising is intended to drive streams (and not to drive the user to add items to a watch list or other interest list), then the user browsing context may be determined to be a consumption mode, and adaptive filtering of items may be attenuated, changed to a different mode or degree, or disabled.

In general, the user's browsing context may be determined based on an analysis of various data points included in the contextual information. The scenarios illustrated and described with reference to FIG. 1 herein provide a couple of examples of how the user's browsing context may be determined. However, there may be a potentially large number of data points available in the contextual information which may be analyzed to provide a high degree of granularity and nuance associated with the user's current and past browsing sessions, which can contribute to a wide variety of possible outcomes.

At block 204, the process 200 accesses a candidate list of items for possible recommendation for the user. The candidate list of items for possible recommendation may be based on, for example, a watch list, or other interest list associated with an account of the user. In some embodiments the candidate list of items may be generated by the recommendation service 114 and may include additional items not on the watch list or interest list.

At block 206, the process 200 determines a time interval by which to filter candidate items from the list. The time interval may be useful to, for example, remove candidate items from the list and/or down-rank candidate items which may be of less interest to the user, such as due to the relative recency by which they were added to a watch list. In some instances, the time interval may be a fixed period of time (for example, a certain number of minutes, hours, days, weeks, etc.), such that, when the filter is applied, any items added to the watch list within the fixed period of time may be removed from the candidate list of items (and thus, not be provided as an item recommendation). In some instances, the time interval may be a variable period of time which may be determined or calculated based on a variety of factors. For example, the variable period of time may be determined based on the typical or average elapsed time between any user adding any title to their watch list and actually watching it. Or, the variable period of time may be determined based on the typical or average elapsed time between the particular user adding any title to their watch list and actually watching it. Or, the variable period of time may be determined based on the elapsed time between any user adding that title to their watch list and actually watching it, among other factors At block 208, the process 200 filters or weights the candidate list of item recommendations based at least in part on the determined user browsing context and the determined time interval. For example, as illustrated and described with reference to the scenarios in FIG. 1, a list or queue of candidate video items may be generated, reordered, and/or adjusted based on the user browsing session and the time interval. The determination, reordering, or adjustment of the item recommendation may also involve, for example, giving different amounts of weight to the nature of the merchandising content in which the item recommendation is to be provided, such that the interactive system may give more weight to merchandising content designed to drive or generate video streaming when it is determined that the user is in a consumption mode. In one embodiment, a weighting may be applied based on recency, such that items recently added to the watch list are shown less frequently in item recommendations or merchandising than items the customer has not yet considered. This weighting may be multiplied with any other weighting described herein. In general, multiple weightings described herein may be applied at once by multiplying the weightings together with any score or value assigned to a candidate recommendation (e.g., for adjusting rankings). Thus, for example, both an adaptive filter weight and a recency weight may be applied to a candidate recommendation score.

At block 210, the process 200 provides one or more item recommendations from the filtered or weighted candidate list of items. For example, the item recommendation(s) may be provided to the computing device 130 (for example, via a browser or application running on the computing device 130). The user interfaces shown in FIGS. 3 and 4 illustrate a couple of examples of user interfaces which may be configured to display the item recommendation(s) in association with the user's browsing context.

Example User Interfaces

Figure 3:
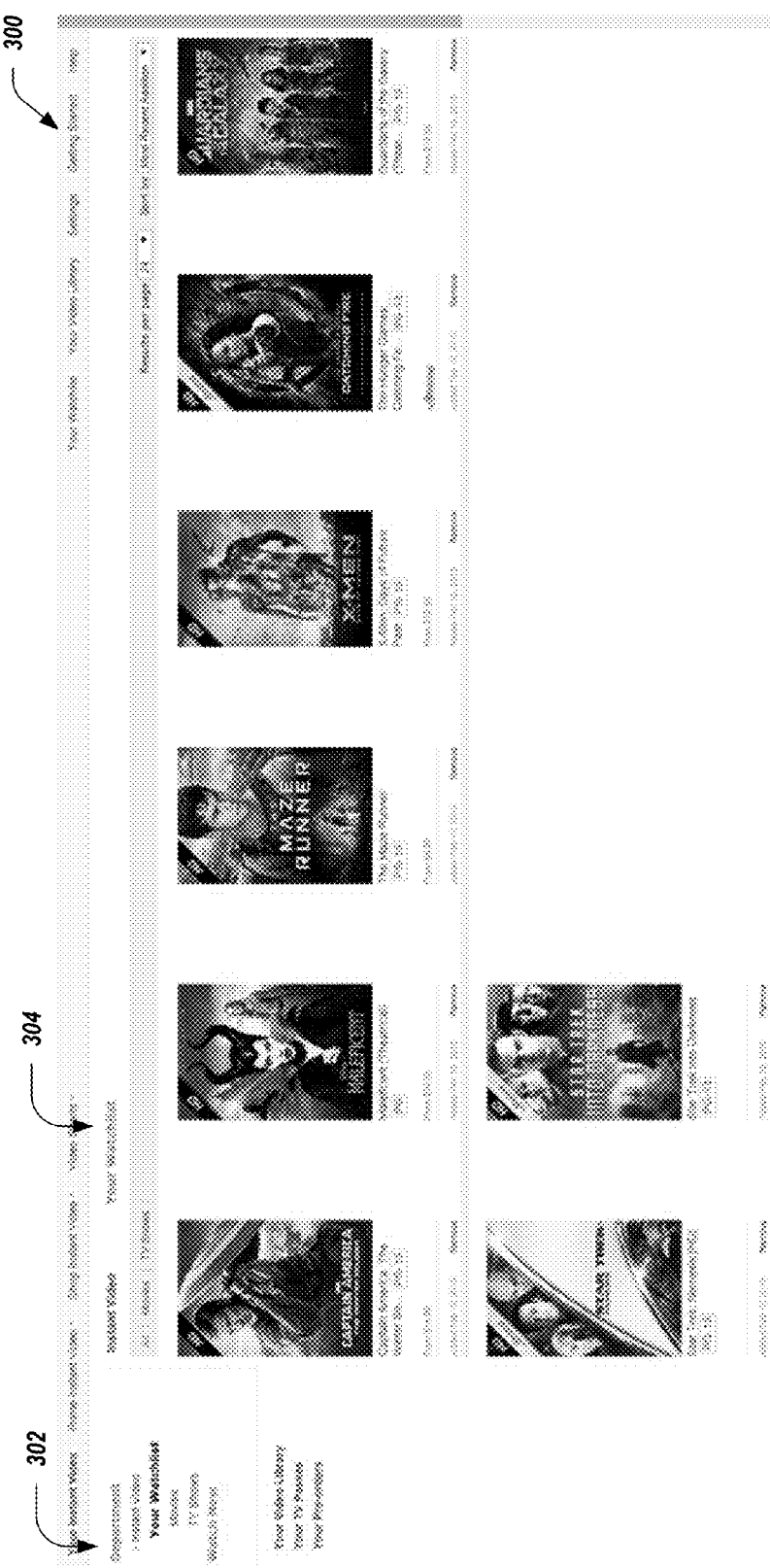
FIG. 3 is a pictorial diagram of an example user interface that illustrates a web-based application for interacting with a network-based digital content service, including user features for viewing a video watch list and browsing a catalog including video content, involving an interactive system, such as the interactive system of FIG. 5.
Figure 4:
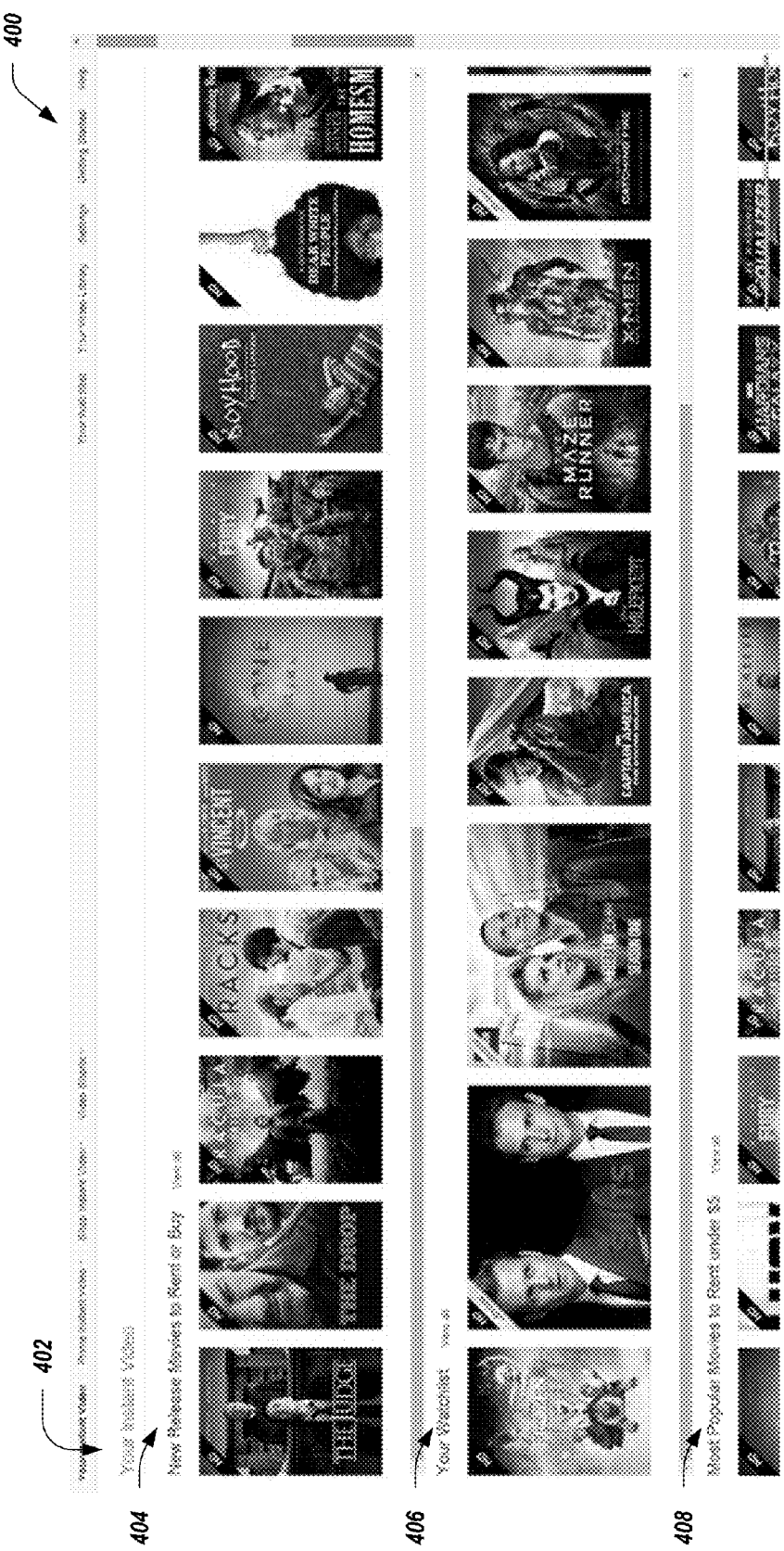
FIG. 4 is a pictorial diagram of an example user interface that illustrates a web-based application for interacting with a network-based digital content service, including user features for browsing a catalog including video content and item recommendations, involving an interactive system, such as the interactive system of FIG. 5.

FIGS. 3 and 4 illustrate sample user interfaces that may be generated by or used with an interactive system, such as the interactive system 100 of FIG. 5. In various embodiments, each of the user interfaces shown in FIGS. 3 and 4 may be presented as a web page, as a mobile application display, as a stand-alone application display, as an email message, as a text message (for example, a short message service (SMS) or a multimedia messaging service (MMS) message) or by other communication means. In other embodiments, analogous interfaces may be presented using audio or other forms of communication. In an embodiment, the interfaces shown in FIGS. 3 and 4 are configured to be interactive and respond to various user interactions. Such user interactions may include clicks with a mouse, typing with a keyboard, touches, and/or gestures on a touch screen, voice commands, and/or the like. The application interfaces may be generated by the web server 102 (FIG. 5) using a repository of page templates 110, or by a mobile application, installed on the computing device 130, that is provided in association with the digital content service provided by the interactive system 100.

FIG. 3 is an example pictorial diagram of an example user interface ("UI") 300 that illustrates a web-based application for interacting with a network-based digital content service, including user features for viewing a video watch list and browsing a catalog including video content, involving an interactive system, such as the interactive system of FIG. 5.

As illustrated at user interface control 302, the user (in this example) is presented with a menu of options by which she can browse a video library offered as part of a digital content service. User interface control 304 presents the user with a list of items currently in her watch list, which may be filtered by type (for example, TV shows, movies) and/or sorted for example by date and time of addition. The watch list may for example be used as an input for a source list of candidate items to be recommended to the user for viewing later, such as when the interactive system 100 determines that the user is in a "consumption mode."

FIG. 4 is an example pictorial diagram of an example user interface ("UI") 400 that illustrates a web-based application for interacting with a network-based digital content service, including user features for browsing a catalog including video content and item recommendations, involving an interactive system, such as the interactive system of FIG. 5.

User interface control 402 presents the user with a list of newly released moves to rent or buy; user interface control 404 presents the user with a list of items appearing in her watch list; and user interface control 406 presents the user with a list of movies which are popular and available to rent for under $5. Each of the lists displayed at feature 402 and 406 may include, for example, one or more item recommendations which are personalized for the user, which may be generated by the recommendation service 114. The item recommendations included in these lists may be filtered according to the processes described herein. For example, if it is determined that the user is currently in "discovery mode," then those items appearing in the watch list 404 that were recently added to the watch list may be removed or moved to the end of the lists of items appearing in UI features 402 and 406 (for example, in order to provide additional recommended content and prevent or reduce duplication of items presented to the user). Or, if it is determined that the user is currently in "consumption mode," then items appearing in the watch list 404 may also appear in the lists of items appearing in UI features 402 and 406 (for example, in order to encourage the user to watch these items now).

Other variations on the user interfaces 300 and 400 may also be possible. For example, certain user interface controls and features shown in user interfaces 300 and 400 may be omitted, displayed, or arranged differently.

Example System

FIG. 5 schematically illustrates one embodiment of an interactive system 100 that implements the above and other features described herein. The interactive system 100 may be implemented as a computerized system that comprises multiple programmed computing devices (for example, web server machines, application servers, storage servers, load balancers, etc.) that communicate over one or more networks. The interactive system 100 hosts a web site that provides functionality for users to browse an electronic catalog of items that are available for purchase. The items represented in the catalog may include, for example, physical products, music or video downloads, electronic book downloads software applications, magazine subscriptions, mobile service plans, and other types of items that can be purchased. Although described in the context of a web site, the inventive features described herein can also be implemented in other types of interactive systems, including interactive television systems. Further, although described in the context of products that are available for purchase or consumption, the disclosed features are also applicable to other types of items, including services, news articles, blogs, web sites, and television shows.

The web server 102, which may include any number of physical servers, dynamically generates web pages in response to requests from the user computing devices 130 (for example, personal computers, laptops, portable computing devices, mobile phones, electronic book readers, PDAs, tablets, etc.). The web pages can be generated using a repository of web page templates 110, using data retrieved from a set of services 104. The types of services 104 can vary widely, and may include, for example, a search service that processes search queries including free-form search strings submitted by users, a tag service that allows users to tag items, and a transaction processing services that processes purchases and/or other types of transactions.

The interactive system 100 also includes a repository of catalog content 106. The catalog content may include, for example, product images, product descriptions, user ratings, and reviews of particular products, price and availability data, seller data, etc. The item information in this repository may be viewable by end users through a browsable electronic catalog in which each item may be described in association with a corresponding network page, which can be referred to as an item detail page. Each item detail page may include, for example, an item image and description, customer ratings, customer and professional reviews, sales rank data, lists of related items, and/or other types of supplemental data that may assist consumers in making informed purchase decisions. Users of the system may, in some embodiments, locate specific item detail pages within the electronic catalog by executing search queries, navigating a browse tree, and/or using various other navigation techniques. An item detail page may be associated with one or more uniform resource identifiers ("URIs") that may be interpreted by a browser or other program operating on a computing device in order to present the item details, request the page information from a server or other system, or the like.

As shown in FIG. 5, the interactive system 100 also includes a repository of user browsing contextual data 116, which may comprise data describing contextual data gathered for particular users during one or more browsing sessions over a period of time. The user browsing contextual data 116 may comprise any type of contextual information as described herein.

The interactive system 100 also includes a catalog service 112 that a catalog service that returns catalog data for particular items. The catalog service 112 provides access to catalog content 106 that may store information about an item catalog, including item details, item categories, item relationships, item ratings, customer reviews, author pages, user-generated list pages, forum pages, blog pages, and the like. In one embodiment, at least some of this content is arranged in a hierarchical structure, having items associated with one or more categories or browse nodes in a hierarchy. The catalog service 112 can provide functionality for users to browse pages in the item hierarchy in addition to searching the catalog. Users can select an item represented in the hierarchy or in a list of search results to view more details about an item.

The interactive system 100 also includes a recommendation service 114 that performs and provides the item recommendations services described herein, including accessing and/or generating recommendation candidates and ranking (or re-ranking) the candidates based at least in part on determined consumer behavior and other criteria as described herein. For example, the recommendations service 114 may be configured to execute certain aspects of the process 200 described herein.

The recommendations service 114 may include a recommendation candidate selector 118 that may be configured to generate or select one or more recommendation candidates to recommend to the user based on the user profile data 124. The recommendation candidates may have associated scores indicating a relative strength of relevance to the user. For example, the recommendation candidate selector 118 may select the N most highly scored candidates to recommend. Alternatively, the recommendation candidate selector 118 may select a different subset. For example, in some cases it can be beneficial to show recommendations that are not determined to be the best in order to provide fresh recommendations to the user, among other reasons. In certain embodiments, the recommendation candidates may comprise, for example, items which the user has added to a watch list or wish list, thereby indicating at least an initial level of interest by the user in the items.

The recommendations service 114 may also include an adaptive filtering engine 120. The adaptive filtering engine 120 may be configured to, for example, access or retrieve user browsing contextual data from the user browsing contextual data 116, and analyze the contextual data to determine what type of behavior in which the consumer is engaged while browsing (for example, discovering content or consuming content). As discussed in more detail with reference to FIGS. 1 and 2, the contextual data may be analyzed to determine whether it appears likely that the consumer is in a "discovery" mode or a "consumption" mode, among other things. In an embodiment, the adaptive filtering performed by the adaptive filtering engine is not the adaptive filtering used in digital signal processing.

The ranking engine 122 may be configured to, for example, use the determined consumer behavior from the adaptive filtering engine 120 to remove or re-arrange one or more of the recommendation candidates. The ranking engine 122 may use the determined consumer behavior to update or re-rank an already-ranked set of items, or can rank the items if not already ranked (for example, to generate or determine an initial ranking of the set of items). For example, a particular candidate recommendation with a relatively lower score or ranking after the initial ranking is generated may receive a ranking "boost" or a ranking "downgrade" based on the consumer behavior and contextual data. This may be of benefit to the user receiving the provided recommendations, as the user may be more interested in items while in a "consumption" mode, or less interested in items (such as items already on a watch list or wish list) while in a "discovery mode."

User profile data store 124 may store, for example, item preference data reflective of actions performed by a user. These actions might include, for example, purchasing items, rating items, adding items to the user's wish list, providing data on the user's friends, tagging items, searching for items, and the like. The item preference data may include browse history data (for example, data on user searches, clicks, a category browsed by the user and the like), purchase history data, friends' data, tags data, and many other types of data.

Additional Embodiments

In some embodiments, the interactive system 100 can be configured differently than shown in FIG. 5. Many variations and alternatives are possible, and no single component or group of components is essential or required to be present in every embodiment of the interactive system 100.

The interactive system 100 may also include functionality and components (not shown) for enabling users to perform various other types of functions, including but not limited to the following: (1) purchasing items selected from the electronic catalog, (2) creating wish lists of items selected from the catalog, and searching for and viewing the wish lists of other users, (3) conducting keyword searches for specific catalog items, (4) browsing the catalog using a browse category-based item browse tree, (5) creating personal profiles that are viewable by other users, (6) posting items for sale in the electronic catalog, (7) tagging specific catalog items and (8) posting customer reviews, recommendations and ratings of particular catalog items.

The various components shown in FIG. 5 may be implemented in an appropriate combination of hardware and software. For example, the web server 102 may be implemented using physical servers (with processors, memory, etc.) that are programmed with executable program code to respond to display page requests by generating and returning web pages. As a further example, the web server 102 could be implemented by virtual machines instances existing on one or more physical computing devices. The recommendation candidate selector 118, the adaptive filtering engine 120, and the ranking/re-ranking engine 122 may similarly be implemented using programmed physical servers, virtual machine instances, or general purpose computers.

In the environment shown in FIG. 5, a user of the interactive system 100 may utilize a user computing device 130 to communicate with the interactive system 100. The communication may occur via a communication network, such as the Internet or other communications link. Those skilled in the art will recognize that the user computing device 130 may be any of a number of computing devices that are capable of communicating over a network. For example, the user computing devices can include, but are not limited to, a laptop, personal computer, personal digital assistant (PDA), hybrid PDA/mobile phone, mobile phone, electronic book reader, digital media player, tablet computer, gaming console or controller, kiosk, augmented reality device, other wireless device, set-top or other television box, and the like.

The network may be any wired network, wireless network, or combination thereof. In addition, the network may be a personal area network, local area network, wide area network, cable network, satellite network, cellular telephone network, etc. or combination thereof. In addition, the network may be a personal area network, local area network, wide area network, cable network, satellite network, cellular telephone network, etc. or combination thereof. In addition, the network may be a personal area network, local area network, wide area network, over-the-air broadcast network (for example, for radio or television), cable network, satellite network, cellular telephone network, or combination thereof. For example, the network may be a publicly accessible network of linked networks, possibly operated by various distinct parties, such as the Internet. In some embodiments, the network may be a private or semi-private network, such as a corporate or university intranet. The network may include one or more wireless and/or cellular networks, such as a Global System for Mobile Communications (GSM) network, a Code Division Multiple Access (CDMA) network, a Long Term Evolution (LTE) network, or some other type of wireless network. The network can use protocols and components for communicating via the Internet or any of the other aforementioned types of networks. Protocols and components for communicating via the Internet or any of the other aforementioned types of communication networks are well known to those skilled in the art and are not described in more detail herein.

The interactive system 100 is depicted in FIG. 5 as operating in a distributed computing environment including several computer systems that are interconnected using one or more computer networks. The interactive system 100 may have a fewer or greater number of components than are illustrated in FIG. 5. Thus, the depiction of the interactive system 100 in FIG. 5 should be taken as example and not limiting to the present disclosure. For example, the interactive system 100 could implement various Web services components and/or peer-to-peer network configurations to implement at least a portion of the processes described herein.

The interactive system 100 is also responsible for providing communication with various user devices, such as user computing device 130. The communication provided by the interactive system 100 may include generating text and/or graphics, possibly organized as a user interface using hypertext transfer or other protocols in response to information inquiries received from the various user devices. The interactive system 100 may obtain information on available goods and services from one or more data stores, such as catalog content repository 106, as is done in conventional electronic commerce systems. In certain embodiments, the interactive system 100 may also access item data from other data sources, either internal or external to interactive system 100.

Conclusion

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by a computing system that includes one or more general purpose computers or processors. The code modules may be stored in any type of non-transitory computer-readable medium or other computer storage device. Some or all the methods may alternatively be embodied in specialized computer hardware. In addition, the components referred to herein may be implemented in hardware, software, firmware or a combination thereof.

Many other variations than those described herein will be apparent from this disclosure. For example, depending on the embodiment, certain acts, events, or functions of any of the algorithms described herein can be performed in a different sequence, can be added, merged, or left out altogether (for example, not all described acts or events are necessary for the practice of the algorithms). Moreover, in certain embodiments, acts or events can be performed concurrently, for example, through multi-threaded processing, interrupt processing, or multiple processors or processor cores or on other parallel architectures, rather than sequentially. In addition, different tasks or processes can be performed by different machines and/or computing systems that can function together.

The various example logical blocks and modules described in connection with the embodiments disclosed herein can be implemented or performed by a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, for example, a combination of a DSP and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, or algorithm described in connection with the embodiments disclosed herein can be embodied directly in hardware, in a software module stored in one or more memory devices and executed by one or more processors, or in a combination of the two. A software module can reside in RAM memory, flash memory, ROM memory, EPROM memory, EEPROM memory, registers, hard disk, a removable disk, a CD-ROM, or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile. The processor and the storage medium can reside in an ASIC. The ASIC can reside in a user terminal. In the alternative, the processor and the storage medium can reside as discrete components in a user terminal.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (for example, X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A system comprising:
   an electronic data store configured to at least store contextual information for browse sessions of users with respect to digital content items available from an electronic catalog; and
   a computing system comprising one or more hardware computing devices, said computing system in communication with the electronic data store and configured to at least:
      access, from the electronic data store, contextual information associated with a browse session for a user, wherein the contextual information includes one or more attributes indicative of a user browsing context for the browse session;
      determine the user browsing context with respect to items available from the electronic catalog based at least in part on the contextual information;
      generate a candidate list of candidate video content recommendation items for the user such that the candidate list includes (i) one or more items from a watch list associated with the user and (ii) one or more additional items not in the watch list, the watch list indicative of one or more items previously added to the watch list to be watched later and when the one or more items were added to the watch list;
      determine, based at least in part on an amount of time elapsed between (i) when a given item other than those included in the candidate list is added to the watch list associated with the user and (ii) when the given item is watched by the user the user, a time interval by which to filter the candidate list;
      remove one or more candidate items that do not satisfy the determined time interval from the candidate list; and
      provide one or more video content item recommendations from the candidate list that does not include the one or more removed candidate items for presentation to the user.

2. The system of claim 1, wherein the determined user browsing context is indicative of the user exploring video content items to add to the watch list in a content discovery mode during the browse session of the user.

3. The system of claim 2, wherein the contextual information indicates that a user computing device used for the browse session of the user is a tablet computing device or a smart phone, wherein the computing system is further configured to determine the user browsing context indicative of the user being in the content discovery mode based at least in part on the indication that the user computing device used for the browse session of the user is a tablet computing device or a smart phone.

4. The system of claim 1, wherein the determined user browsing context is indicative of the user watching video content items in a content consumption mode during the browse session of the user.

5. The system of claim 4, wherein the contextual information indicates that a user computing device used for the browse session of the user is a laptop computer or a television, wherein the computing system is further configured to determine the user browsing context indicative of the user being in the content consumption mode based at least in part on the indication that the user computing device used for the browse session of the user is a laptop computer or a television.

6. A system comprising:
a computing system comprising one or more hardware computing devices, said computing system configured to at least:
access contextual information associated with a browse session for a user, wherein the contextual information includes one or more attributes indicative of a user browsing context for the browse session;
determine the user browsing context with respect to items available from an electronic catalog based at least in part on the contextual information;
generate a candidate list of candidate digital content recommendation items for the user such that the candidate list includes (i) one or more items from a watch list associated with the user and (ii) one or more additional items not in the watch list, the watch list indicative of one or more items added to the watch list and when the one or more items were added to the watch list;
determine, based at least in part on an amount of time elapsed between (i) when a given item is added to the watch list and (ii) when the given item is watched, a time interval by which to filter the candidate list;
remove one or more candidate items that do not satisfy the determined time interval from the candidate list; and
output one or more digital content item recommendations from the candidate list that does not include the one or more removed candidate items.

7. The system of claim 6, wherein the determined user browsing context is indicative of the user exploring video content items to add to the watch list during the browse session of the user.

8. The system of claim 6, wherein the determined user browsing context is indicative of the user consuming video content items during the browse session of the user.

9. The system of claim 6, wherein the contextual information is indicative of a type of user computing device used for the browse session of the user.

10. The system of claim 6, wherein the computing system is further configured to:
remove a candidate item from the candidate list, wherein the candidate item was added to the watch list at a previous time period that precedes a current time period by less than the determined time interval.

11. The system of claim 6, wherein the computing system is further configured to:
apply a respective weighting factor to each candidate item in the candidate list, based on the determined user browsing context, the determined time interval, and a time period associated with the candidate item; and
reorder the candidate items in the candidate list based on the respective weighting factors.

12. The system of claim 6, wherein the computing system is further configured to:
determine an average elapsed time between (1) the user adding an item to the user's watch list and (2) the user actually watching the item.

13. The system of claim 6, wherein the computing system is further configured to:
determine an average elapsed time across a plurality of users between (1) a respective user in the plurality of users adding an item to the respective user's watch list and (2) the respective user actually watching the item.

14. The system of claim 6, wherein the computing system is further configured to:
determine an average elapsed time across a plurality of users other than the user between (1) a respective user in the plurality of users adding a specific item in the candidate list associated with the user to the respective user's watch list and (2) the respective user actually watching the specific item.

15. Non-transitory physical computer storage comprising computer-executable instructions stored thereon that, when executed by a hardware processor, are configured to perform operations comprising:
accessing, from an electronic data store, contextual information associated with a browse session for a user, wherein the contextual information includes one or more attributes indicative of a user browsing context for the browse session;
determining the user browsing context with respect to items available from the electronic catalog based at least in part on the contextual information;
generating a candidate list of candidate video content recommendation items for the user such that the candidate list includes (i) one or more items from a watch list associated with the user and (ii) one or more additional items not in the watch list, the watch list indicative of one or more items added to the watch list and when the one or more items were added to the watch list;
determining, based at least in part on an amount of time elapsed between (i) when a given item is added to the watch list and (ii) when the given item is watched, a time interval by which to reorder the list of candidate video content recommendation items;
reordering the candidate list based at least in part on the determined time interval and the one or more time periods at which the one or more items in the watch list were added to the watch list; and
providing one or more video content item recommendations from the reordered candidate list to the consumer computing device.

16. The non-transitory physical computer storage of claim 15, wherein the determined user browsing context is indicative of the user exploring video content items to add to the watch list during the browse session of the user.

17. The non-transitory physical computer storage of claim 15, wherein the determined user browsing context is indicative of the user consuming video content items during the browse session of the user.

18. The non-transitory physical computer storage of claim 15, wherein the contextual information includes historical browse information indicative of a discovery time range during which the user explores content items or indicative of a consumption time range during which the user consumes content items.

19. The non-transitory physical computer storage of claim 15, wherein the time interval is determined based on an average elapsed time between (1) the user adding an item to the user's watch list and (2) the user actually watching the item.

20. The non-transitory physical computer storage of claim 15, wherein the time interval is determined based on an average elapsed time across a plurality of users between (1) a respective user in the plurality of users adding an item to the respective user's watch list and (2) the respective user actually watching the item.

21. The non-transitory physical computer storage of claim 15, wherein the time interval is determined based on an average elapsed time across a plurality of users other than the user between (1) a respective user in the plurality of users adding a specific item in the candidate list associated with the user to the respective user's watch list and (2) the respective user actually watching the specific item.

\* \* \* \* \*